(12) United States Patent
Hoermandinger et al.

(10) Patent No.: US 8,205,702 B2
(45) Date of Patent: Jun. 26, 2012

(54) BATTERY ARRANGEMENT

(75) Inventors: Klaus Hoermandinger, Leonberg (DE); Achim Klink, Talheim (DE)

(73) Assignee: Dr. Ing. h.c.F. Porsche Aktiengellschaft (DE)

( * ) Notice: Subject to any disclaimer, the term of this patent is extended or adjusted under 35 U.S.C. 154(b) by 429 days.

(21) Appl. No.: 12/536,535

(22) Filed: Aug. 6, 2009

(65) Prior Publication Data
US 2010/0059299 A1    Mar. 11, 2010

(30) Foreign Application Priority Data
Sep. 10, 2008   (DE) .................. 10 2008 051 085

(51) Int. Cl.
B60R 16/04    (2006.01)
B60K 11/00    (2006.01)
H01M 10/50    (2006.01)

(52) U.S. Cl. .................. 180/68.5; 180/68.1; 180/68.2; 429/120

(58) Field of Classification Search .......... 180/68.1, 180/68.2, 68.5, 65.29; 429/120; *B60K 11/06, B60K 1/04; B60R 16/04*
See application file for complete search history.

(56) References Cited

U.S. PATENT DOCUMENTS

| | | | | | |
|---|---|---|---|---|---|
| 4,468,440 | A | * | 8/1984 | Evjen | 429/8 |
| 5,392,873 | A | * | 2/1995 | Masuyama et al. | 180/68.5 |
| 5,490,572 | A | * | 2/1996 | Tajiri et al. | 180/65.1 |
| 5,964,279 | A | * | 10/1999 | Mochizuki et al. | 165/104.33 |
| 6,085,854 | A | * | 7/2000 | Nishikawa | 180/68.5 |
| 6,094,927 | A | * | 8/2000 | Anazawa et al. | 62/239 |
| 6,152,096 | A | * | 11/2000 | Setsuda | 123/184.21 |
| 6,188,574 | B1 | * | 2/2001 | Anazawa | 361/695 |
| 6,189,635 | B1 | * | 2/2001 | Schuler et al. | 180/68.5 |
| 6,211,646 | B1 | * | 4/2001 | Kouzu et al. | 320/107 |
| 6,220,383 | B1 | * | 4/2001 | Muraki et al. | 180/68.5 |
| 6,445,582 | B1 | * | 9/2002 | Oda et al. | 361/695 |
| 6,541,151 | B2 | * | 4/2003 | Minamiura et al. | 429/98 |
| 6,606,245 | B2 | * | 8/2003 | Oda et al. | 361/695 |
| 6,622,809 | B2 | * | 9/2003 | Takahashi | 180/68.5 |
| 6,662,891 | B2 | * | 12/2003 | Misu et al. | 180/68.1 |
| 6,798,658 | B2 | * | 9/2004 | Takedomi et al. | 361/694 |
| 6,811,197 | B1 | * | 11/2004 | Grabowski et al. | 296/37.8 |
| 6,902,020 | B2 | * | 6/2005 | Kronner et al. | 180/68.5 |
| 7,017,361 | B2 | * | 3/2006 | Kwon | 62/259.2 |
| 7,048,321 | B2 | * | 5/2006 | Bandoh et al. | 296/37.8 |
| 7,079,379 | B2 | * | 7/2006 | Yamaguchi et al. | 361/676 |

(Continued)

FOREIGN PATENT DOCUMENTS
DE    40 29 018    3/1992
(Continued)

*Primary Examiner* — John R Olszewski
*Assistant Examiner* — Jacob Meyer
(74) *Attorney, Agent, or Firm* — Gerald E. Hespos; Michael J. Porco

(57) ABSTRACT

A battery arrangement (1) has at least two battery cell packs (2, 3) arranged in a common battery housing (4). The battery housing (4) has at least one first opening (5) for supplying cooling air and at least one second opening (6) for discharging heated air. The battery cell packs (2, 3) are arranged one above the other and delimit a tunnel (7) therebetween in a height direction. At least one of the first and second openings (5, 6) is arranged substantially at the same level as the tunnel (7). The tunnel (7) is closed at a side facing one of the first and second openings (5, 6) so that air flowing between the first and second openings (5, 6) is channeled through or around the battery cell packs (2, 3).

9 Claims, 1 Drawing Sheet

U.S. PATENT DOCUMENTS

| | | | |
|---|---|---|---|
| 7,112,387 B2 | 9/2006 | Kimoto et al. | |
| 7,172,831 B2* | 2/2007 | Jaura et al. | 429/72 |
| 7,240,752 B2* | 7/2007 | Takahashi et al. | 180/68.1 |
| 7,353,900 B2* | 4/2008 | Abe et al. | 180/68.5 |
| 7,511,455 B2* | 3/2009 | Yoneda | 320/112 |
| 7,642,002 B2* | 1/2010 | Hamery et al. | 429/120 |
| 7,654,351 B2* | 2/2010 | Koike et al. | 180/68.5 |
| 7,823,671 B2* | 11/2010 | Inoue et al. | 180/68.4 |
| 7,892,671 B2* | 2/2011 | Hamery et al. | 429/120 |
| 7,905,307 B2* | 3/2011 | Kubota et al. | 180/68.1 |
| 7,905,308 B2* | 3/2011 | Abe et al. | 180/68.5 |
| 7,924,562 B2* | 4/2011 | Soma et al. | 361/694 |
| 8,003,245 B2* | 8/2011 | Lee et al. | 429/149 |
| 8,047,318 B2* | 11/2011 | Zhu et al. | 180/68.2 |
| 8,048,554 B2* | 11/2011 | Yang | 429/120 |
| 8,100,210 B2* | 1/2012 | Takeuchi et al. | 180/68.5 |
| 2001/0030069 A1* | 10/2001 | Misu et al. | 180/68.1 |
| 2002/0051340 A1* | 5/2002 | Oda et al. | 361/695 |
| 2002/0085355 A1* | 7/2002 | Oda et al. | 361/695 |
| 2002/0093246 A1* | 7/2002 | Takahashi | 307/9.1 |
| 2002/0102457 A1* | 8/2002 | Oogami et al. | 429/159 |
| 2002/0187390 A1* | 12/2002 | Kimoto et al. | 429/99 |
| 2003/0067747 A1* | 4/2003 | Hasegawa et al. | 361/695 |
| 2003/0082438 A1* | 5/2003 | Kwon | 429/120 |
| 2004/0232672 A1* | 11/2004 | Bandoh et al. | 280/735 |
| 2005/0011692 A1* | 1/2005 | Takahashi et al. | 180/68.5 |
| 2006/0060402 A1* | 3/2006 | Abe et al. | 180/68.5 |
| 2006/0115721 A1* | 6/2006 | Lee et al. | 429/156 |
| 2007/0026301 A1* | 2/2007 | Lee et al. | 429/120 |
| 2007/0031728 A1 | 2/2007 | Lee et al. | |
| 2007/0289789 A1* | 12/2007 | Tsuchiya | 180/68.2 |
| 2007/0292752 A1* | 12/2007 | Tsuchiya | 429/120 |
| 2008/0047767 A1* | 2/2008 | Tsuchiya | 180/68.5 |
| 2008/0164081 A1* | 7/2008 | Watanabe et al. | 180/65.2 |
| 2008/0196957 A1* | 8/2008 | Koike et al. | 180/68.5 |
| 2008/0257624 A1* | 10/2008 | Kubo | 180/68.1 |
| 2009/0183935 A1* | 7/2009 | Tsuchiya | 180/68.1 |
| 2011/0200860 A1* | 8/2011 | Brodie et al. | 429/120 |
| 2011/0300421 A1* | 12/2011 | Iritani et al. | 429/72 |
| 2011/0318625 A1* | 12/2011 | Yajima et al. | 429/120 |
| 2012/0031695 A1* | 2/2012 | Tsuchiya et al. | 180/68.5 |

FOREIGN PATENT DOCUMENTS

| | | |
|---|---|---|
| JP | 8-310256 | 11/1996 |
| JP | 9-289042 | 11/1997 |
| JP | 11-067178 | 3/1999 |
| JP | 2001-105894 | 4/2001 |

* cited by examiner

BATTERY ARRANGEMENT

CROSS-REFERENCE TO RELATED APPLICATIONS

This application claims priority under 35 USC 119 to German Patent Application No. 10 2008 051 085.8 filed on Oct. 9, 2008, the entire disclosure of which is incorporated herein by reference.

BACKGROUND OF THE INVENTION

1. Field of the Invention

The invention relates to a battery arrangement with at least two battery cell packs and to a hybrid vehicle fitted with such a battery arrangement.

2. Description of the Related Art

U.S. Pat. No. 7,017,361 discloses a generic battery arrangement with three battery cell packs arranged in a common battery housing. The battery housing has a first opening for supplying cool air and a second opening for discharging heated air. The three battery cell packs are arranged adjacent to one another and, due to that adjacent arrangement, are subjected to different levels of cooling, which can have an adverse effect on the power of the battery arrangement.

JP 2001 10 58 94 A and JP 08 31 02 56 A each disclose battery arrangements having battery cells arranged in a battery housing. The battery housing is provided with a cooling device that blows a preferably continuous air flow through the battery housing to cool the individual battery cells and to increase the power of the battery arrangement. However, the control of the cooling air flow is only effective to a limited extent.

JP 11 06 71 78 A and JP 09 28 90 42 disclose further cooled battery arrangements.

An object of the subject invention is to provide a battery arrangement that requires only a small installation space and that provides particularly effective cooling.

SUMMARY OF THE INVENTION

The invention relates to a battery arrangement with at least two battery cell packs disposed one above the other in a battery housing with an interposed spacing between the battery cell packs. Thus, a tunnel is defined between the battery cell packs. The tunnel defines a cooling air supply duct or cooling air discharge duct. The battery housing has at least one first opening for the supply of cool air and at least one second opening for the discharge of heated air. However, a plurality of first openings and a plurality of second openings may be provided The first opening may be arranged substantially at the same level as the tunnel and the tunnel may be closed off at a side facing toward the second opening. Thus, air flowing in through the first opening flows into the tunnel, through or around the battery cell packs and out via the second opening.

Alternatively, at least the second opening is arranged substantially at the same level as the tunnel and the tunnel is closed off at a side facing toward the first opening. Thus, air flowing in through the first opening flows through or around the battery cell packs, into the tunnel and out via the second opening.

The disposition of the battery cell packs one above the other, enables a battery arrangement with a relatively small installation space requirement. The interposed tunnel simultaneously ensures that the cooling air flow passes uniformly through both battery cell packs so that the battery cell packs are cooled uniformly. Different levels of cooling, as known for example from the prior art, therefore are eliminated effectively. As a result, the power of the battery arrangement of the invention can be increased.

A fan preferably is arranged in the region of the first or second opening. The fan may, for example, be arranged in an air-guiding housing or in an air-guiding duct composed of plastic. The fan may for example be an electrically operated fan that can be controlled or regulated, in a temperature-dependent fashion, by means of a suitable control/regulating device. This control permits a tailored air flow within the battery housing. Such electric fans can be produced in virtually any desired embodiment and in a cost-effective manner. Corresponding fans may be provided both in the region of the first opening and also in the region of the second opening. The fan in the region of the first opening blows cooling air into the battery housing, while the fan which in the region of the second opening sucks heated air out of the battery housing. However either a blowing fan or a sucking fan may be used.

Further important features and advantages of the invention can be gathered from the claims, from the drawings and from the associated description of the figures on the basis of the drawings.

It is self-evident that the features specified above and the features yet to be explained below can be used not only in the respectively specified combination, but rather also in other combinations or individually without departing from the scope of the invention.

Preferred exemplary embodiments of the invention are illustrated in the drawings and are explained in more detail in the following description, with identical reference symbols denoting identical or similar or functionally identical components.

DETAILED DESCRIPTION OF THE PREFERRED EMBODIMENTS

Figure 1:
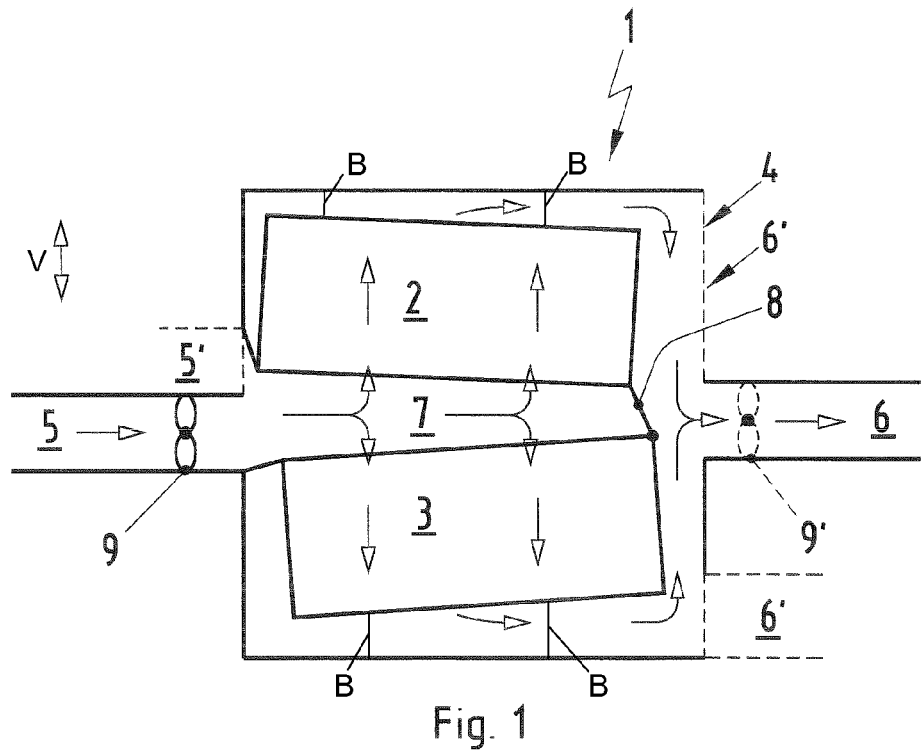
FIG. 1 shows a sectioned illustration through a battery arrangement according to the invention in a first alternative embodiment.

A battery arrangement in accordance with a first embodiment of the invention is identified generally by the numeral 1 in FIG. 1. The battery arrangement 1 has two battery cell packs 2 and 3 arranged together in a battery housing 4 so that the battery housing 4 surrounds the battery cell packs 2 and 3. The battery housing 4 has at least one first opening 5 for supplying cooling air and at least one second opening 6 for the discharging heated air. Further first openings 5' or second openings 6' may be provided and are illustrated by dashed lines in FIGS. 1 and 2. However, reference always is made herein to one first opening 5 and one second opening 6 for better comprehensibility.

The two battery cell packs 2 and 3 are arranged one above the other and are spaced apart from one another in the vertical direction V. Thus, the two battery cell packs 2 and 3 delimit, in terms of height, an interposed tunnel 7.

The battery arrangement 1 of the first embodiment of the invention has the first opening 5 arranged substantially at the same level as the tunnel 7 and communicates directly with the tunnel 7 so that cooling air cannot escape into the space between the battery cell packs 2, 3 and the battery housing 4 at positions downstream of the battery cell packs 2, 3. Additionally, the tunnel 7 is closed off at a side facing toward the second opening 6 by means of a closure element 8, so that the air flows in through the first opening, into the tunnel 7, through and around the battery cell packs 2, 3 and out via the second opening 6. Here, the air flow is illustrated by the arrows plotted in the battery housing 4.

Figure 2:
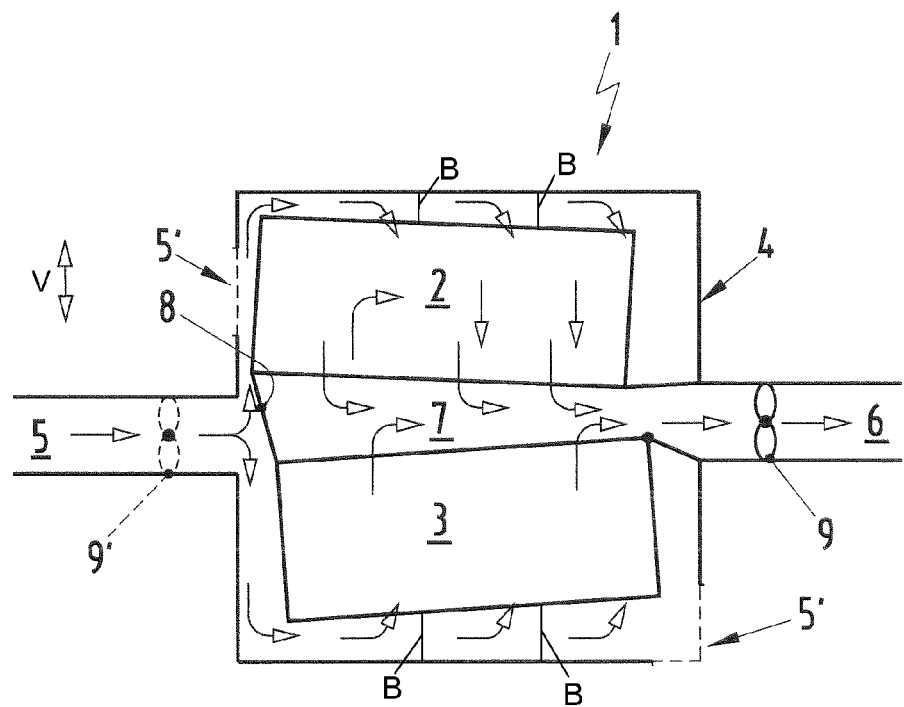
FIG. 2 shows a sectioned illustration through a battery arrangement according to the invention in a second alternative embodiment.

A second alternate embodiment of the invention is illustrated in FIG. 2 and has at least the second opening 6 arranged at the same level as the tunnel 7. The tunnel of the second embodiment is closed off at a side facing toward the first opening 5 provides direct communication to the second opening 6. Thus, cooling air flows in through the first opening 5, into the space between the battery cell packs 2, 3 and the battery housing 4, through the battery cell packs 2, 3, into the tunnel 7 and out again via the second opening 6.

Both embodiments have the great advantage that a cooling air flow passes uniformly through both battery cell packs 2 and 3, and hence both battery cell packs 2 and 3 are cooled uniformly. The arrangement of the two battery cell packs 2 and 3 one above the other enables a relatively dense packaging and a small footprint with a corresponding decisive advantage. More particularly, the battery arrangement 1 requires only a comparatively small installation space. The two battery cell packs 2 and 3 are parts of a high voltage battery suitable for use in hybrid vehicles. The hybrid motor vehicle usually is driven by two different drives, namely an internal combustion engine and an electric motor. "High voltage battery" is a term of art and is considered to include those batteries that can provide the considerable amount of electrical power that must be provided for operation of the hybrid vehicle by the electric motor. Thus, the two battery cell packs 2 and 3 for this purpose conventionally are designed as the above-specified high-voltage batteries.

Both embodiments of the invention illustrate a fan 9 that may be arranged in the region of the first opening 5 and/or in the region of the second opening 6. The fan 9 is illustrated by solid lines in the region of the first opening 5 in FIG. 1 and generates a forced air flow into the battery housing 4. Thus, the fan 9 of FIG. 1 forces the cooling air into the tunnel 7 and subsequently through the battery cell packs 2 and 3 to the second opening 6. In contrast, the fan 9 shown in solid lines in FIG. 2 is arranged in the region of the second opening 6. The fan 9 of FIG. 2 generates a vacuum in the battery housing 4, and accordingly sucks the air that has been heated by the battery cell packs 2 and 3 out of the tunnel 7. As a further alternate, the battery arrangement 1 of FIG. 1 can provide the fan 9 in communication with the first opening 5 and also a fan 9' in communication with the second opening 6 if a high level of cooling power is required. Similarly, the battery arrangement 1 of FIG. 2 can provide the fan 9 in communication with the second opening 6 and also a fan 9' in communication with the first opening 6 if a high level of cooling power is required. As still a further alternate, the battery arrangement 1 of FIG. 1 can have only the fan 9' at the second opening 6 and/or the battery arrangement 1 of FIG. 2 can have only the fan 9' at the first opening 5 The fan 9, 9' can be regulated or controlled in a continuously variable fashion, and can thereby be adapted in terms of its delivery power individually, and according to demand, to a corresponding cooling demand of the battery arrangement 1.

Brackets B are arranged in the battery housing 4 for anchoring the two battery cell packs 2 and 3 so that cooling air can flow between the battery cell packs 2, 3 and the housing 4. Of course, more than two battery cell packs 2 and 3 can be arranged one above the other with tunnels 7 between the vertically adjacent battery cell packs. Air guidance within the battery housing 4 and in proximity to the three or more battery cell packs can be achieved by means of corresponding branching at the first opening 5 or at the second opening 6, so that the air flow passes into and through all the tunnels 7 simultaneously.

The battery arrangement 1 according to the invention enables uniform and particularly effective cooling of the individual battery cell packs 2 and 3 and also reduces an installation space requirement of the battery arrangement 1. Space reduction is particularly advantageous with regard to an ever-decreasing availability of installation space in vehicles.

What is claimed is:

1. A battery arrangement having at least two battery cell packs arranged in a common battery housing, the battery housing having at least one first opening for supplying cooling air and at least one second opening for discharging heated air, the battery cell packs being arranged one above the other and delimiting a tunnel therebetween in a height direction, at least one of the first and second openings being arranged substantially at the same level as the tunnel and the tunnel being closed at a side facing one of the first and second openings so that air flowing between the first and second openings is channeled through or around the battery cell packs.

2. The battery arrangement of claim 1, wherein at least the first opening is arranged substantially at the same level as the tunnel and the tunnel is closed at a side facing the second opening so that air flowing in through the first opening flows through the tunnel, through or around the battery cell packs and out via the second opening.

3. The battery arrangement of claim 1, wherein at least the second opening is arranged substantially at the same level as the tunnel and the tunnel is closed off at a side facing toward the first opening so that air flowing in through the first opening flows through or around the battery cell packs, into the tunnel and out via the second opening.

4. The battery arrangement of claim 1, wherein the battery cell packs are constituent parts of a high-voltage battery.

5. The battery arrangement of claim 4, wherein the high-voltage battery is a battery with sufficient power for operating a hybrid vehicle.

6. The battery arrangement of claim 1, further comprising a fan arranged in communication with at least one of the first and second openings.

7. The battery arrangement of claim 1, further comprising brackets in the battery housing and supporting the battery cell packs in the battery housing.

8. The battery arrangement of claim 1, wherein the first and second openings are arranged on opposite sides of the battery housing.

9. A hybrid vehicle having a battery arrangement with at least two battery cell packs arranged in a common battery housing, the battery housing having at least one first opening for supplying cooling air and at least one second opening for discharging heated air, the battery cell packs being arranged one above the other and delimiting a tunnel therebetween in a height direction, at least one of the first and second openings being arranged substantially at the same level as the tunnel and the tunnel being closed at a side facing one of the first and second openings so that air flowing between the first and second openings is channeled through or around the battery cell packs.

* * * * *